(12) United States Patent
Fong

(10) Patent No.: US 7,341,645 B2
(45) Date of Patent: Mar. 11, 2008

(54) SHOCK AND ENERGY DISSIPATING ASSEMBLY

(76) Inventor: Jian Jhong Fong, No. 37, Avenue 54, Lane 944, Sec. 2, Chonsan Road, Changhua 50042 (TW)

( * ) Notice: Subject to any disclaimer, the term of this patent is extended or adjusted under 35 U.S.C. 154(b) by 100 days.

(21) Appl. No.: 11/344,673

(22) Filed: Jan. 31, 2006

(65) Prior Publication Data

US 2007/0063542 A1 Mar. 22, 2007

(30) Foreign Application Priority Data

Sep. 16, 2005 (TW) .............................. 94131967 A

(51) Int. Cl.
*B60R 2/42* (2006.01)

(52) U.S. Cl. ............... 196/68.1; 296/187.03; 297/216.16; 180/274

(58) Field of Classification Search ............ 297/216.1, 297/216.15, 216.16, 216.18, 216.19; 296/68.1, 296/187.03, 187.09, 187.1, 187.11, 187.12; 180/274

See application file for complete search history.

(56) References Cited

U.S. PATENT DOCUMENTS

| 3,721,433 | A |   | 3/1973  | Sobel |
|-----------|---|---|---------|-------|
| 4,789,192 | A |   | 12/1988 | Warner et al. .............. 293/134 |
| 2001/0015565 | A1 | * | 8/2001 | Motozawa et al. ........ 296/68.1 |
| 2001/0015568 | A1 | * | 8/2001 | Motozawa et al. .... 297/216.16 |

\* cited by examiner

*Primary Examiner*—Dennis H Pedder
*Assistant Examiner*—Melissa Black

(57) ABSTRACT

A shock and energy dissipating device includes a number of cylinders attached to an outer peripheral portion of the vehicle for being actuated when a force is applied onto the outer peripheral portion of the vehicle or when a collision happened to the vehicle. A seat device includes a base seat member, a base support for attaching to a bottom of the vehicle, an upper support for attaching to the base seat member and a moving device disposed between the base support and the upper support and coupled to the cylinders for moving the base seat member in response to the cylinders and for absorbing and dissipating an energy that may be transmitted to vehicle drivers or passengers of the vehicle.

18 Claims, 18 Drawing Sheets

SHOCK AND ENERGY DISSIPATING ASSEMBLY

BACKGROUND OF THE INVENTION

1. Field of the Invention

The present invention relates to a shock and energy dissipating assembly, and more particularly to a shock and energy dissipating assembly for attaching to vehicles and for absorbing and for dissipating the hits or collisions or shocks that may be transmitted to the vehicle drivers or the passengers and for preventing the vehicle drivers or the passengers from being hurt.

2. Description of the Prior Art

Various kinds of typical shock and energy dissipating devices or assemblies have been developed and attached to various vehicles for absorbing and dissipating the hits or shocks that may be transmitted to the vehicle drivers or passengers and for preventing the vehicle drivers or passengers from being hurt.

For example, U.S. Pat. No. 3,721,433 to Sobel discloses one of the typical deformable shack absorbing guards comprising one or more flexible and compressible and/or rigid, frangible and crushable crash devices attached to the front or rear portions of the vehicles for reducing shock of collision and to effect gradual deceleration upon collision.

However, the seats of the vehicles may not be moved in correspondence to the directions of the hits or shocks or collisions applied to the vehicles, such that the vehicle drivers and/or the passengers may also be moved and hurt due to the momentum of the vehicles.

U.S. Pat. No. 4,789,192 to Warner et al. discloses another typical two stage variable orifice energy absorber comprising an inner telescoping cylinder and an outer telescoping cylinder with a radially fixed flow control orifice in the piston cap for recessing a cooperating metering pin and for controlling the flow of fluid between a pair of contractible and expansible fluid chambers to dissipate impact energy.

However, similarly, the telescoping cylinders have not been coupled to the seats of the vehicles, and the seats of the vehicles also may not be moved in correspondence to the directions of the hits or shocks or collisions applied to the vehicles, such that the vehicle drivers and/or the passengers may also be moved and hurt due to the momentum of the vehicles.

The present invention has arisen to mitigate and/or obviate the afore-described disadvantages of the conventional shock and energy dissipating assemblies.

SUMMARY OF THE INVENTION

The primary objective of the present invention is to provide a shock and energy dissipating assembly for attaching to vehicles and for absorbing and for dissipating the hits or collisions or shocks that may be transmitted to the vehicle drivers or the passengers and for preventing the vehicle drivers or the passengers from being hurt.

The other objective of the present invention is to provide a shock and energy dissipating assembly for attaching or coupling to the seats of the vehicles and for allowing the seats to be moved in correspondence to the directions of the hits or shocks applied to the vehicles.

In accordance with one aspect of the invention, there is provided a shock and energy dissipating assembly comprising a vehicle, a number of cylinders attached to an outer peripheral portion of the vehicle for being actuated when a force is applied onto the outer peripheral portion of the vehicle, a seat device including a base seat member, a base support for attaching to a bottom of the vehicle, an upper support for attaching to the base seat member of the seat device, and a moving device disposed between the base support and the upper support and coupled to the cylinders for moving the base seat member of the seat device in response to the cylinders and for absorbing and dissipating an energy that may be transmitted to vehicle drivers or passengers of the vehicle.

The cylinders includes at least one front cylinder attached to a front portion of the vehicle, at least one rear cylinder attached to a rear portion of the vehicle, at least one right side cylinder attached to a right side portion of the vehicle, at least one left side cylinder attached to a left side portion of the vehicle, at least one front and side cylinder attached to a front and side portion of the vehicle, and at least one rear and side cylinder attached to a rear and side portion of the vehicle.

The moving device includes a lower support disposed above the base support, and at least one first actuator coupled between the lower support and the base support for the lower support forwardly and rearwardly relative to the base support.

The base support includes a middle rod and a rear rod spaced away from each other, two sliding rods slidably attached onto and movable along the rear and the middle rods, and at least one second actuator coupled between the lower support and one of the sliding rods of the base support for moving the lower support sidewise relative to the base support.

The lower support includes a front pole and a rear pole slidably attached between the sliding rods and movable along the sliding rods, two carriers slidably attached onto the front and the rear poles respectively and coupled together to the second actuator for moving the carriers along the front and the rear poles.

The lower support includes two blocks slidably attached onto each of the sliding rods, the front and the rear poles are attached to the blocks, and the second actuator is coupled to one of the blocks. The lower support includes a link coupled between the carriers and coupled to the second actuator.

The carriers each includes a panel having an inclined guide slot formed therein, the lower support includes a stationary bar, a third actuator coupled between the lower support and the stationary bar for moving the stationary bar relative to the lower support, two linking bars pivotally coupled to the stationary bar and each having a coupling bar, and two follower bars attached to the coupling bars respectively and each having a projection slidably engaged into the guide slots of the panels respectively for guiding the follower bars to move up and down by a sliding engagement of the projections in the guide slots of the panels and by the third actuator.

The carriers each includes a channel formed therein, the lower support includes a sliding bar slidably attached between the carriers and slidably engaged in the channels of the carriers, and the sliding bar is coupled to the stationary bar for being moved by the third actuator.

The carriers each includes an upwardly extending column, and an intermediate support is disposed above the lower support and includes a frame having two side shafts attached to the columns of the carriers and to the follower bars for allowing the frame of the intermediate support to be moved up and down by the sliding engagement of the projections in the guide slots of the panels and by the third actuator.

The intermediate support includes a front shaft and a rear shaft coupled between the side shafts, a beam slidably attached onto the side shafts and movable toward and away from the rear shaft, and a fourth actuator coupled between the front shaft and the beam for moving the beam along the side shafts.

The intermediate support includes a middle shaft disposed between the side shafts and disposed between the front and the rear shafts, and a fifth actuator coupled between the middle shaft and the lower support for moving the intermediate support up and down relative to the lower support.

The upper support is disposed above the intermediate support and includes a front stick and a rear stick and two side sticks coupled between the front stick and the rear stick, the rear stick is pivotally attached to the beam for allowing the upper support to be pivoted relative to the intermediate support.

The front stick is pivotally coupled to the intermediate support with at least one coupling stick for guiding the upper support to pivot relative to the intermediate support.

The seat device includes a lower back member pivotally attached to the base seat member, and two side flaps pivotally attached to side portions of the lower back member with axles, and a rotating device for rotating the axles and the side flaps relative to the lower back member to protect a user between the side flaps.

The rotating device includes two cables attached onto the axles respectively, two springs engaged onto the axles for winding the cables onto the axles, and an actuator coupled to the cables respectively for unwinding the cables from the axles against the springs in order to rotate the axles and the flaps relative to the lower back member. The lower back member includes two pulleys for winding and supporting the cables and two pulleys attached to the axles for engaging with the cables respectively.

The seat device includes an upper back member attached onto the lower back member, and an actuator coupled between the upper back member and the lower back member for moving the upper back member relative to the lower back member. The seat device includes a head seat rotatably attached to the upper back member, and device for rotating the head seat relative to the upper back member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
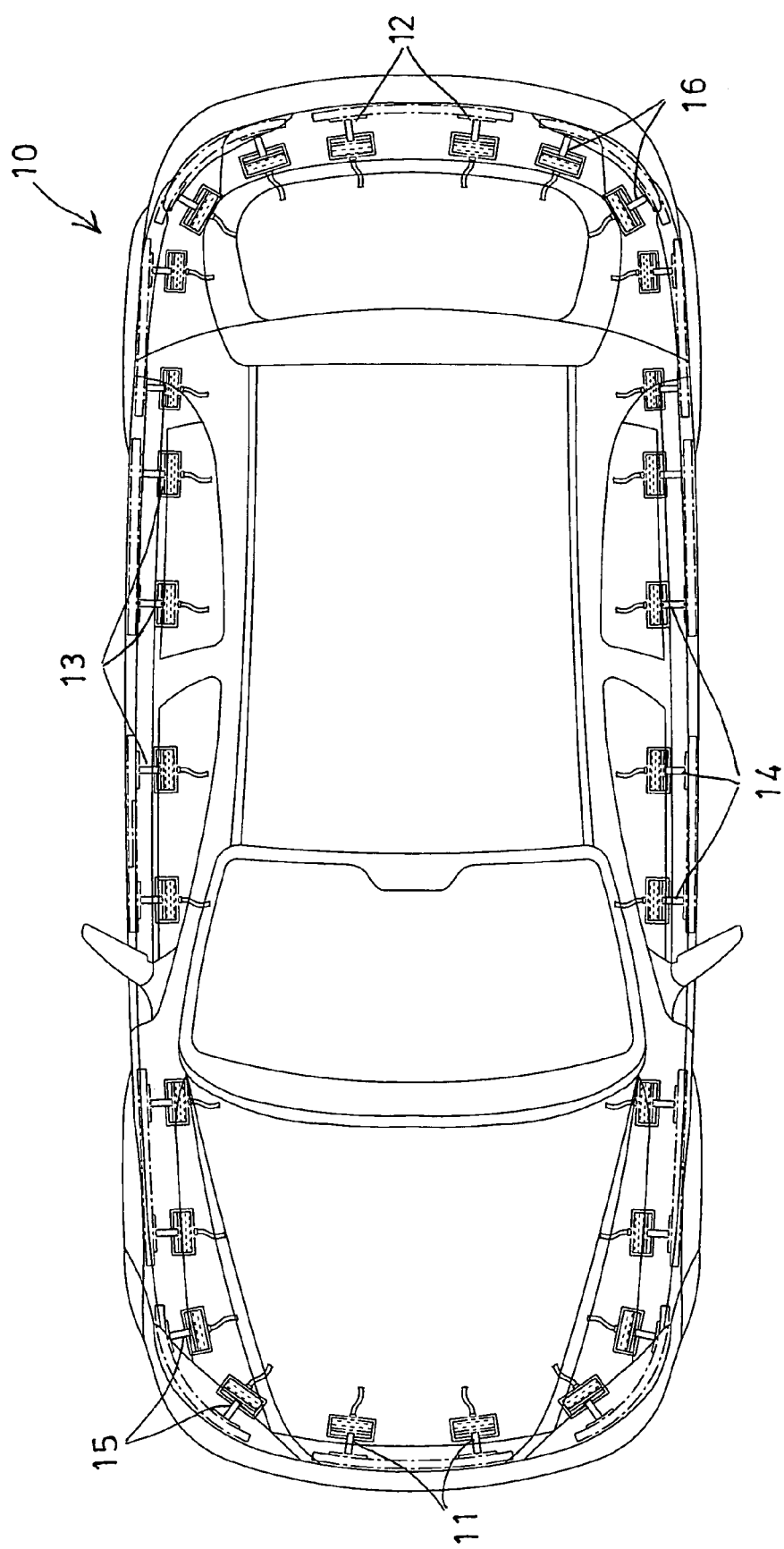
FIG. 1 is an upper plan schematic view illustrating a shock and energy dissipating assembly in accordance with the present invention having a number of cylinders or actuators attached to the outer peripheral portion of a vehicle.
Figure 2:
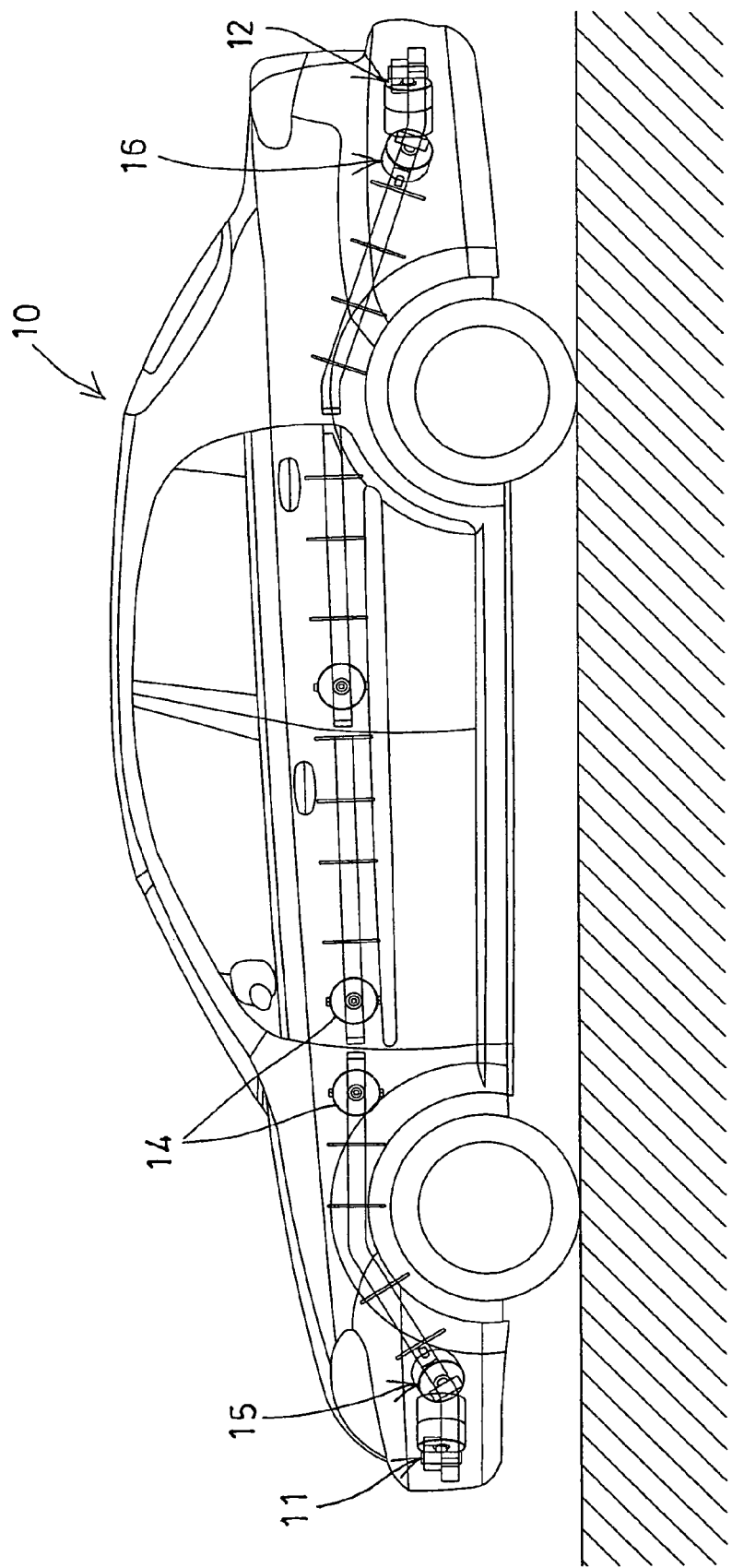
FIG. 2 is a side plan schematic view illustrating the cylinders or actuators of the shock and energy dissipating assembly for attaching to the outer peripheral portion of the vehicle.

Referring to the drawings, and initially to FIGS. 1 and 2, a shock and energy dissipating assembly in accordance with the present invention is provided for attaching to a vehicle 10 and comprises a number of actuators or cylinders 11, 12, 13, 14, 15, 16 for attaching to the outer peripheral portion of the vehicle 10. For example, one or more front cylinders 11 are attached to the front portion of the vehicle 10, one or more further rear cylinders 12 are attached to the rear portion of the vehicle 10, one or more right side cylinders 13 are attached to the right side portion of the vehicle 10, one or more left side cylinders 14 are attached to the left side portion of the vehicle 10.

It is preferable that the shock and energy dissipating assembly further includes one or more front and side cylinders 15 attached to the two front and side portions of the vehicle 10, and one or more rear and side cylinders 16 attached to the two rear and side portions of the vehicle 10. The actuators or cylinders 11-16 are disposed and arranged on or around the outer peripheral portion of the vehicle 10 for being actuated in accordance with or in response to the hits or collisions or shocks that may be applied to the vehicle 10 and that may be transmitted to the vehicle drivers or the passengers and for preventing the vehicle drivers or the passengers from being hurt.

Figure 3:
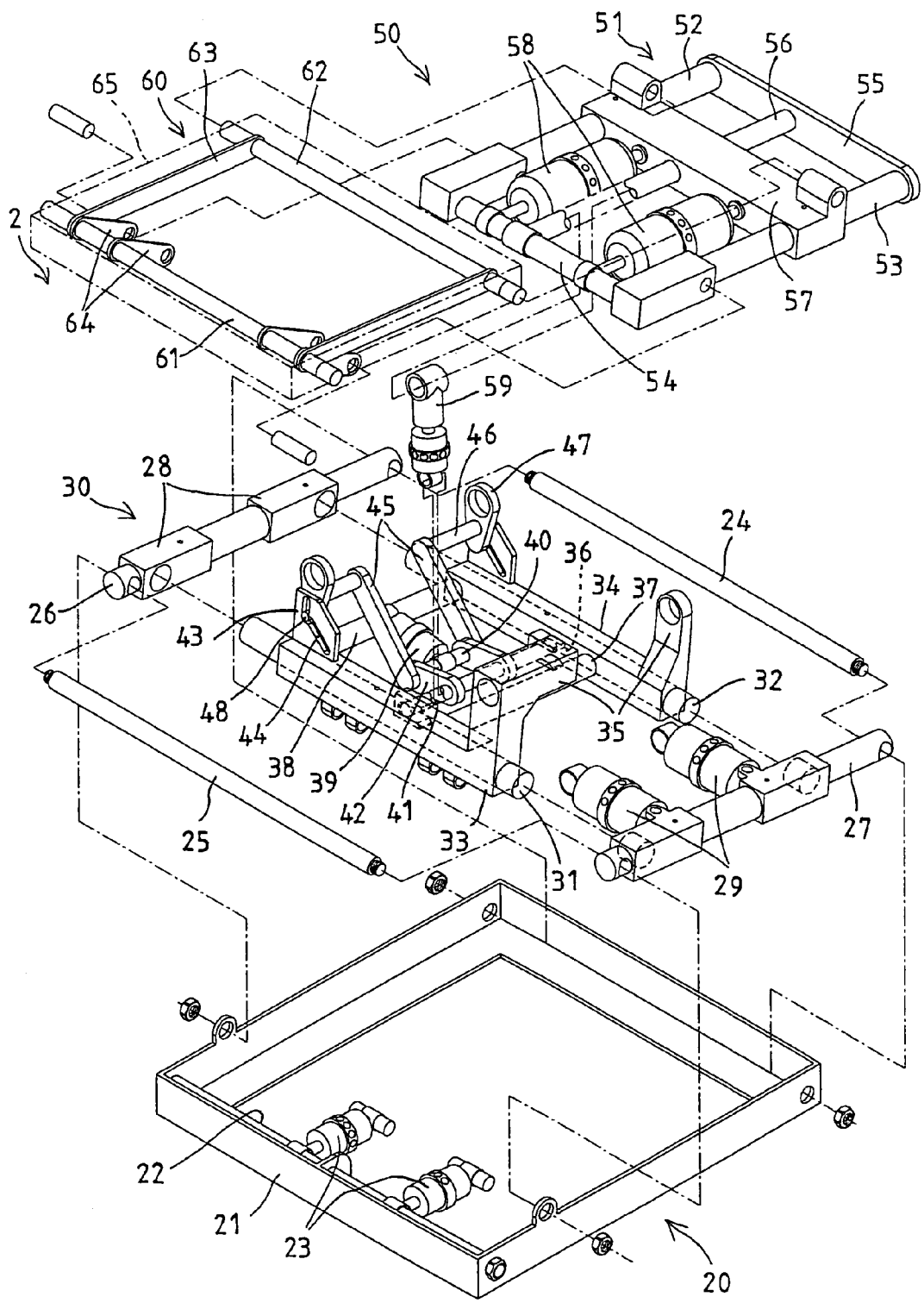
FIG. 3 is a partial exploded view of the shock and energy dissipating assembly.
Figure 4:
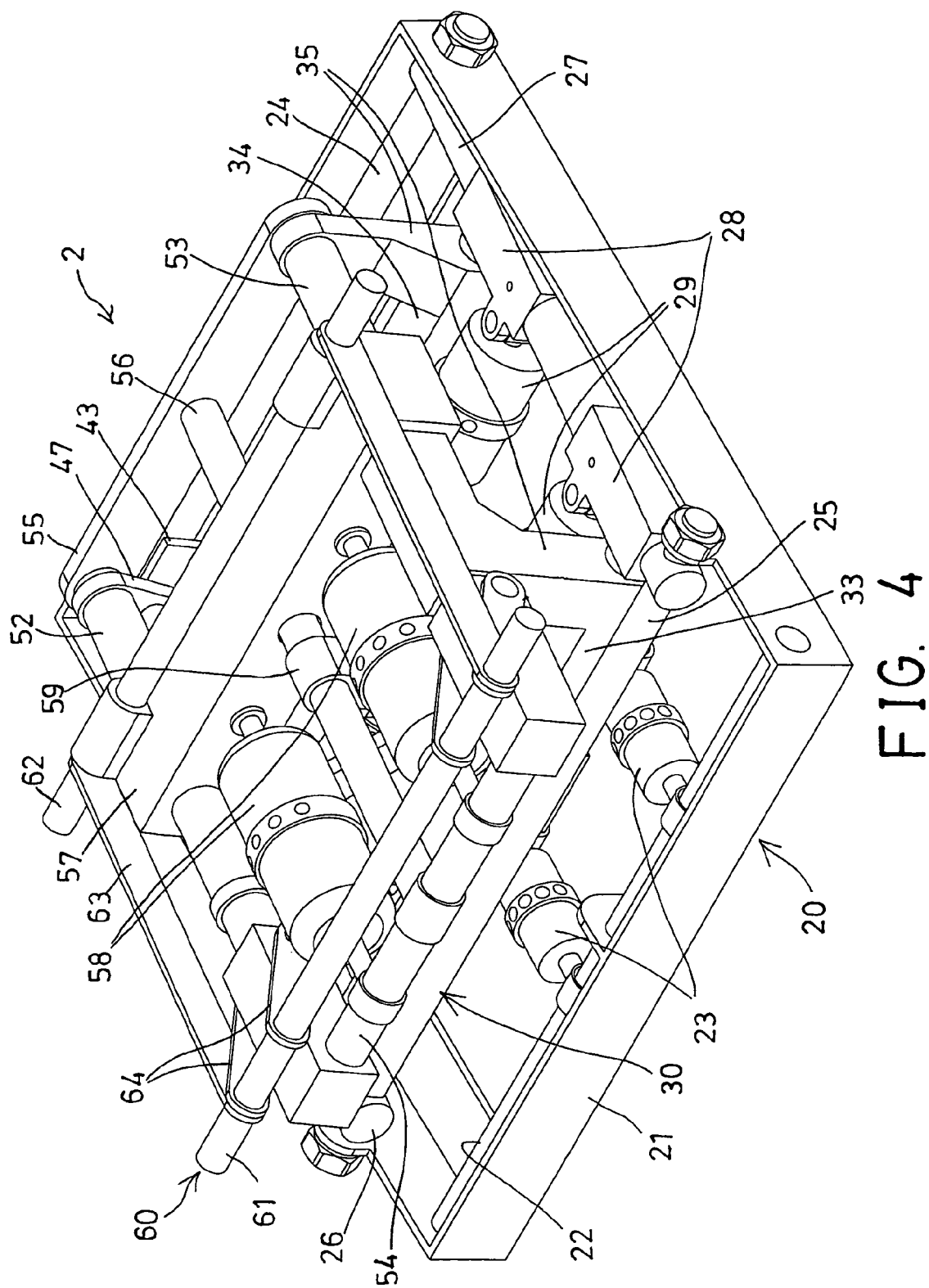
FIG. 4 is a partial upper perspective view of the shock and energy dissipating assembly.
Figure 5:
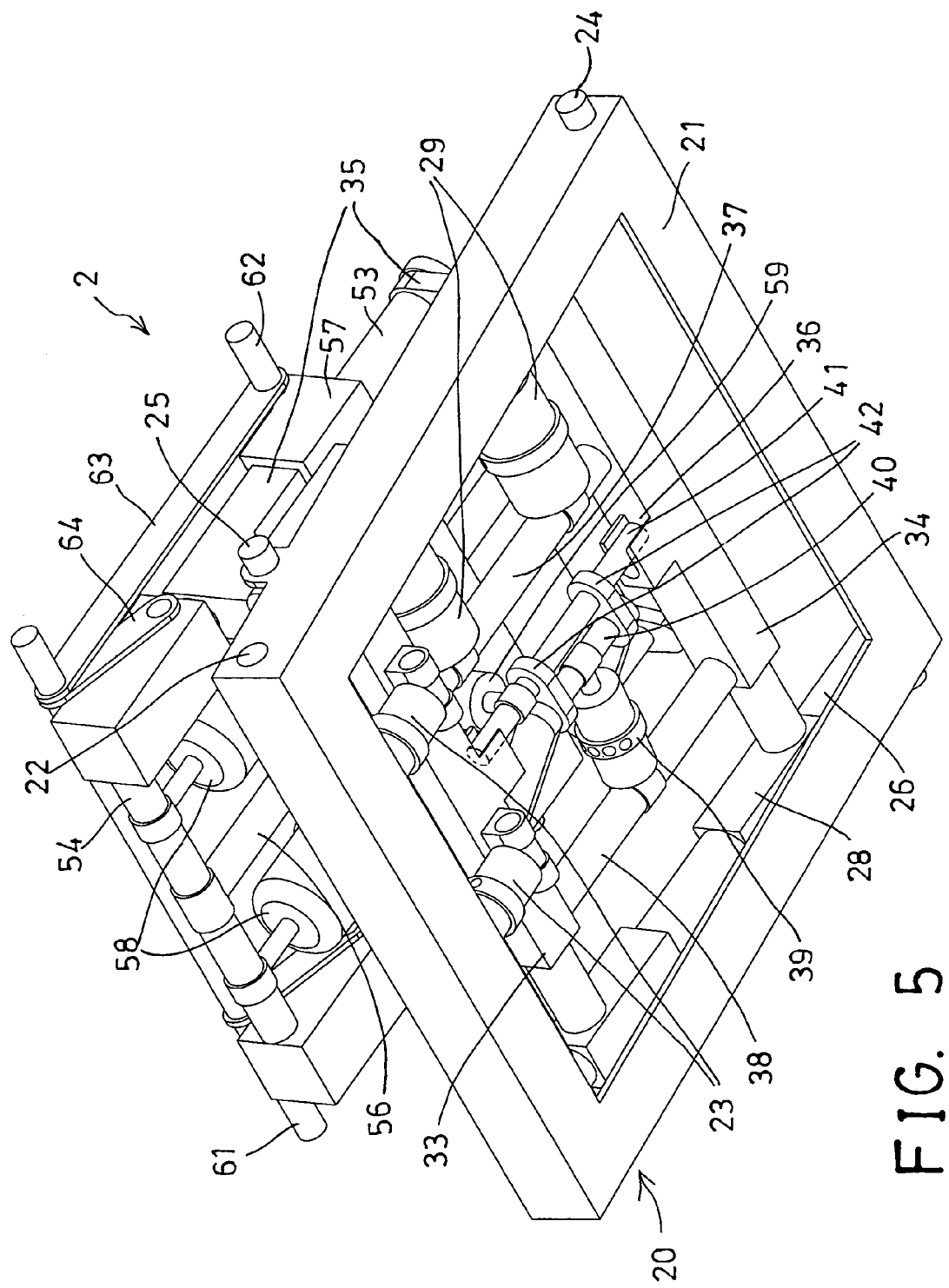
FIG. 5 is a partial bottom perspective view of the shock and energy dissipating assembly.

Referring next to FIGS. 3-5, illustrated is a follower device 2 for being disposed below a seat device 7 of the vehicle 10 (FIGS. 6-10) and for moving the seat device 7 in accordance with or in response to the hits or collisions or shocks. The follower device 2 includes a base support 20 having a frame 21 for being disposed below the seat device 7 of the vehicle 10 (FIG. 10) and for attaching or securing to such as the chassis or the bottom of the vehicle 10, a front rod 22 laterally secured in the front portion of the frame 21, one or more cylinders or actuators 23 are slidably attached to the front rod 22, a rear rod 24 laterally secured in the rear portion of the frame 21, a middle rod 25 laterally secured on the middle portion of the frame 21 and spaced away from the rear rod 24.

The base support 20 of the follower device 2 further includes two sliding rods 26, 27 slidably attached onto and movable along the rear and the middle rods 24, 25, and one or more, such as two blocks 28 are slidably attached onto each of the sliding rods 26, 27, and a cylinder or actuator 29 is attached to each of the blocks 28 that are slidably attached onto one of the sliding rods 27, and arranged for allowing the actuators 29 and the blocks 28 to be guided to move along the sliding rods 26, 27. The sliding rods 26, 27 are preferably tilted or inclined relative to the frame 21, best shown in FIG. 4.

A lower support 30 is provided and disposed above the base support 20 and includes a front pole 31 and a rear pole 32 attached or secured to the blocks 28 respectively and movable along the sliding rods 26, 27 together with the blocks 28. Two carriers 33, 34 are slidably attached onto the poles 31, 32 respectively and each includes an elbow or column 35 extended upwardly therefrom and each includes a channel 36 formed or provided in the middle portion thereof (FIG. 5), and one or more, such as two links 37, 38 are coupled between the carriers 33, 34 for allowing the carriers 33, 34 to be moved in concert with each other.

The actuators 23 are pivotally coupled to the carrier 33 (FIG. 5) for moving the carriers 33, 34 and thus the poles 31, 32 and the blocks 28 and the actuators 29 along the sliding rods 26, 27, a further actuator 39 is attached to one of the links 38, and coupled to a stationary bar 40 which is then pivotally coupled to a sliding bar 41 with one or more coupling bars 42. The end portions of the sliding bar 41 are slidably engaged in the channels 36 of the carriers 33, 34 (FIG. 5) for allowing the sliding bar 41 to be forced or actuated to move relative to the carriers 33, 34 by the actuator 39 and the stationary bar 40 and the coupling bars 42.

The carriers 33, 34 each includes a panel 43 extended upwardly therefrom and located opposite to or distal to the elbow or column 35, and the panels 43 each includes an inclined guide slot 44 formed therein (FIG. 3). One or more, such as two linking bars 45 each has one end rotatably or pivotally coupled to the stationary bar 40 and a coupling bar 46, and two follower bars 47 are attached to the coupling bars 46 respectively and each includes a projection 48 extended therefrom and slidably engaged into the guide slots 44 of the panels 43 respectively for forcing or guiding the bars 45, 46, 47 to move up and down by the sliding engagement of the projections 48 in the guide slots 44 of the panels 43 and by the actuator 39.

An intermediate support 50 is provided and disposed above the lower support 30 and includes a frame 51 formed by two side shafts 52, 53, a front shaft 54 and a rear shaft 55, in which the right or one side shaft 52 is engaged through and attached to the follower bars 47, and the left or other side shaft 53 is engaged through and attached to the columns 35 of the carriers 33, 34, A middle shaft 56 is further provided and disposed between the side shafts 52, 53, and also disposed between the front and the rear shafts 54, 55, and a beam 57 is slidably attached or engaged onto the side shafts 52, 53 and the middle shaft 56 and movable toward and away from the rear shaft 55.

One or more, such as two cylinders or actuators 58 each has one end rotatably or pivotally coupled to the front shaft 54 and the other end coupled to the beam 57 for allowing the beam 57 to be moved toward and away from the rear shaft 55 by the actuators 58. A cylinder or actuator 59 is further provided and has one end rotatably or pivotally coupled to the middle shaft 56 and the other end coupled to the sliding bar 41 (FIG. 5), for actuating or moving the side shaft 52 of the frame 51 and thus the follower bars 47 to move up and down relative to the lower support 30, and thus to force or to cause the projections 48 of the follower bars 47 to slide along the guide slots 44 of the panels 43.

Figure 6:
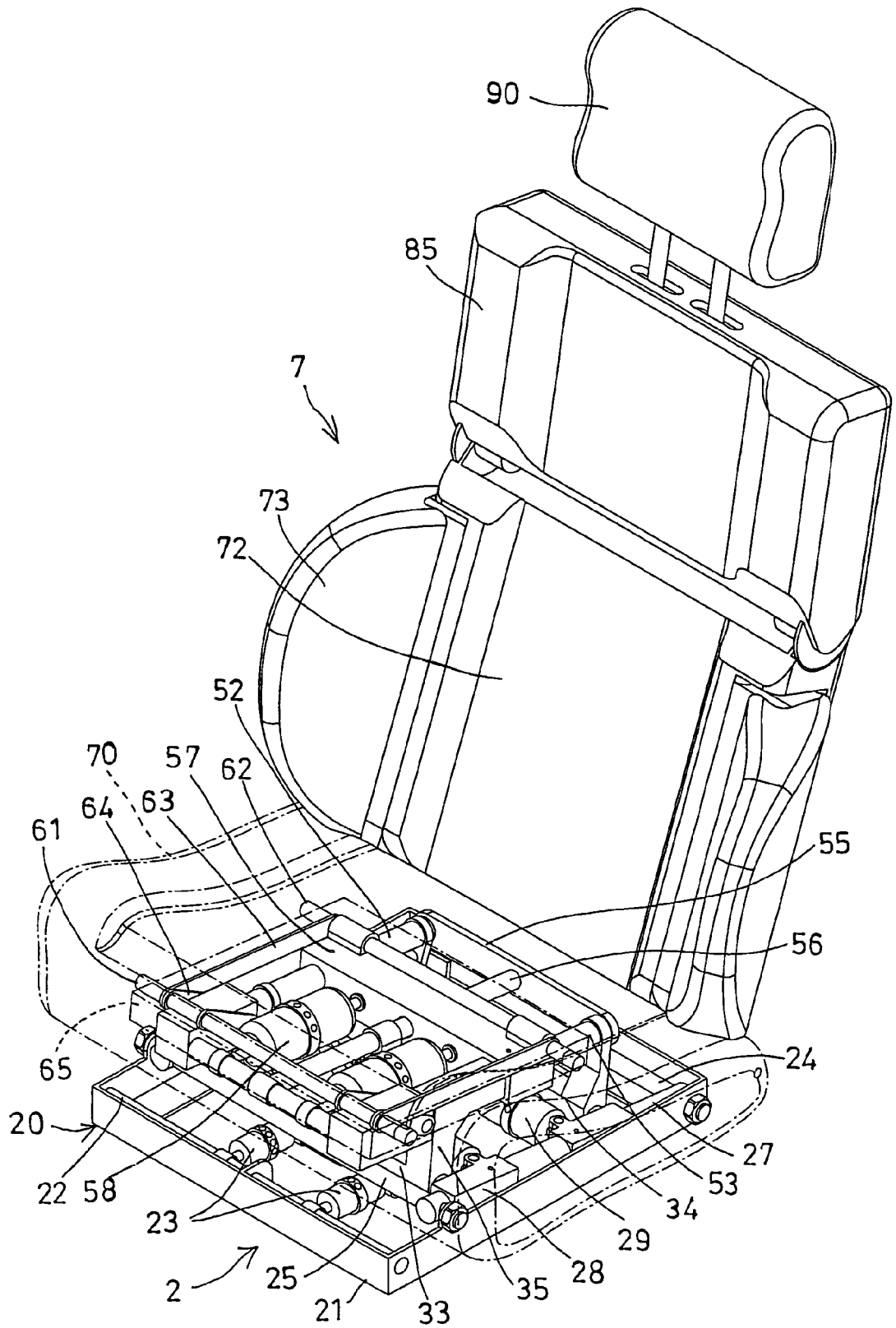
FIG. 6 is a partial upper and front perspective view of the shock and energy dissipating assembly.
Figure 10:
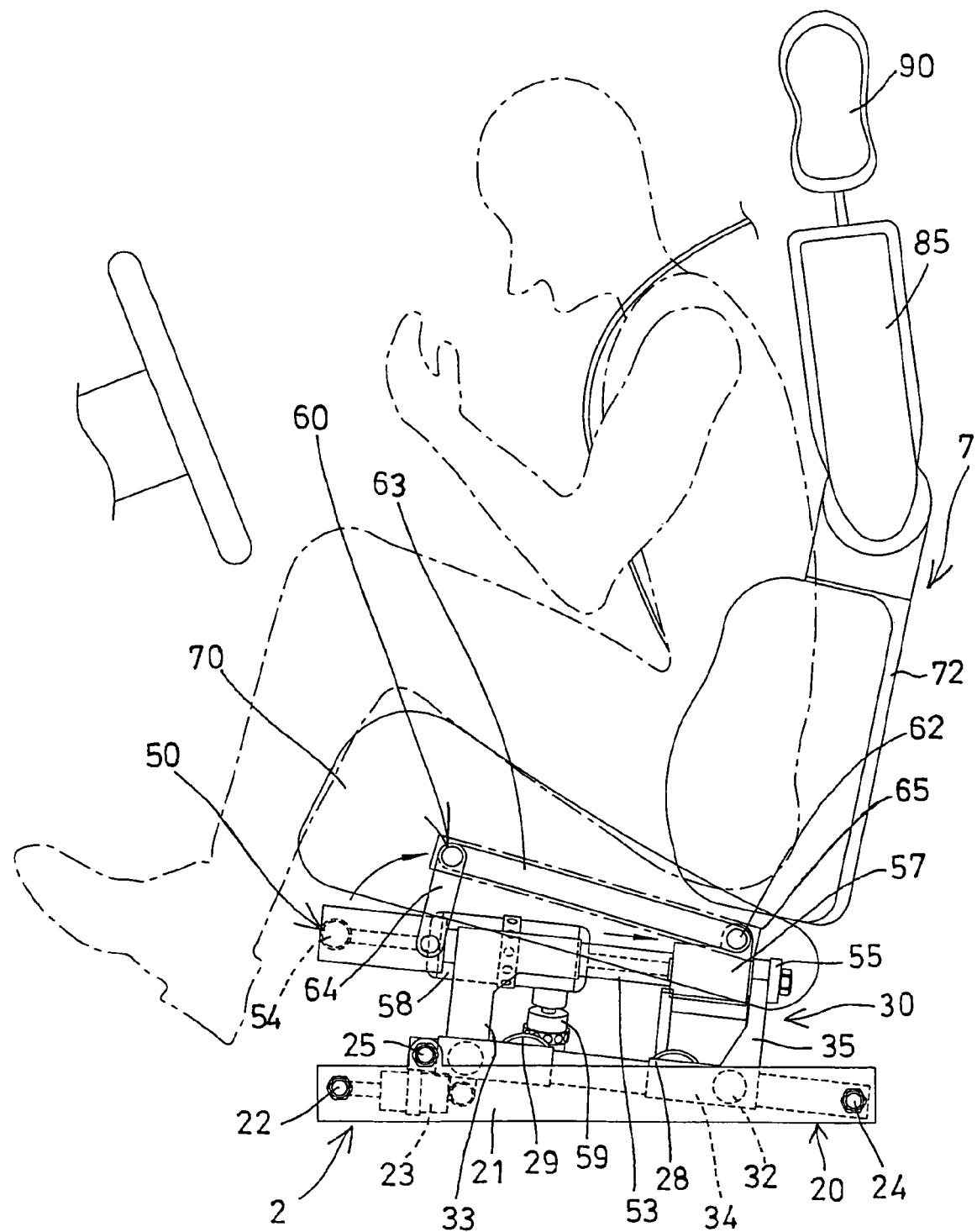
FIG. 10 is a side plan schematic view illustrating the operation of the shock and energy dissipating assembly.

An upper support 60 is provided and disposed above the intermediate support 50 and includes a front stick 61 and a rear stick 62 and two side sticks 63 secured and coupled between the front stick 61 and the rear stick 62 for forming a square or rectangular structure, in which the rear stick 62 is rotatably or pivotally attached to the beam 57 for allowing the upper support 60 to be pivoted or rotated relative to the intermediate support 50, and the front stick 61 is rotatably or pivotally coupled to each of the side shafts 52, 53 with one or more coupling sticks 64. A housing 65 (FIG. 3) is attached or secured to such as the front stick 61 and the rear stick 62 of the upper support 60 for allowing either the housing 65 or the upper support 60 to be attached or secured to the base seat member 70 of the seat device 7 (FIGS. 6, 10).

Figure 7:
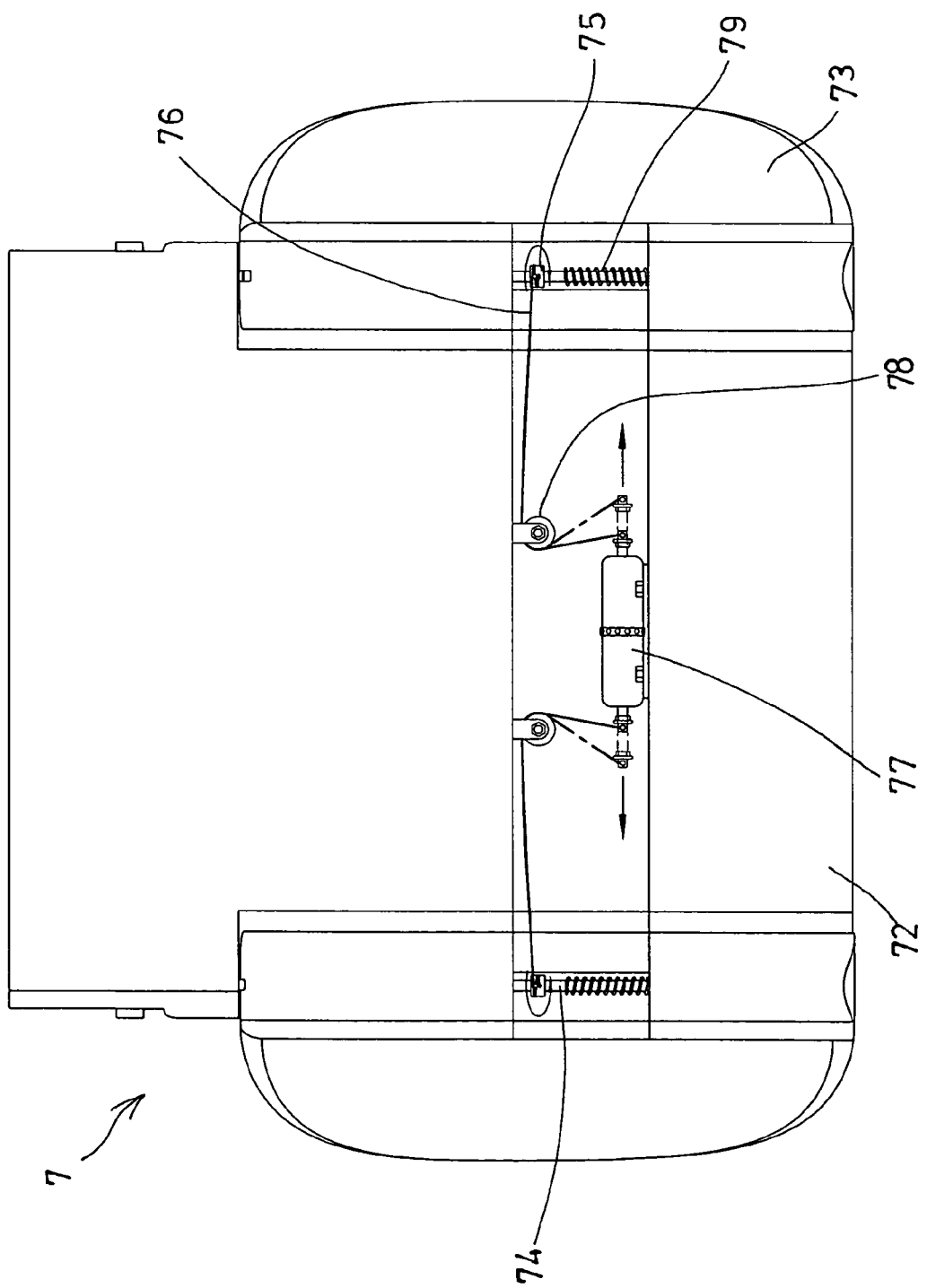
FIG. 7 is a partial front plan schematic view illustrating the movable side flaps of the vehicle seats for protecting the vehicle drivers or the passengers.

Referring next to FIGS. 6-10, the base seat member 70 of the seat device 7 is attached or secured to such as the housing 65 of the upper support 60 for allowing the base seat member 70 of the seat device 7 to be moved in concert with the housing 65 of the upper support 60. For example, the base seat member 70 of the seat device 7 may include a recess 71 formed in the bottom portion thereof (FIG. 8) for receiving or securing the housing 65 of the upper support 60. The seat device 7 further includes a lower back member 72 pivotally attached to the base seat member 70, and two side flaps 73 pivotally attached to the side portions of the lower back member 72 with axles 74 (FIG. 7).

The lower back member 72 includes two pulleys 75 attached onto the axles 74 respectively for winding and supporting a wire or cable 76 thereon. A cylinder or actuator 77 is further provided and has two ends coupled to the cables 76 respectively, and two further pulleys 75 are further attached to the lower back member 72 for allowing the cables 76 to engage over the pulleys 75 before coupling to the ends of the actuator 77. Two springs 79 are engaged onto the axles 74 for winding the cables 76 onto the pulleys 75 and for rotating the axles 74 and thus the flaps 73 outwardly relative to the lower back member 72, and the actuator 77 may unwound the cables 76 from the pulleys 75 against the springs 79 in order to rotate the axles 74 and thus the flaps 73 inwardly relative to the lower back member 72.

Figure 8:
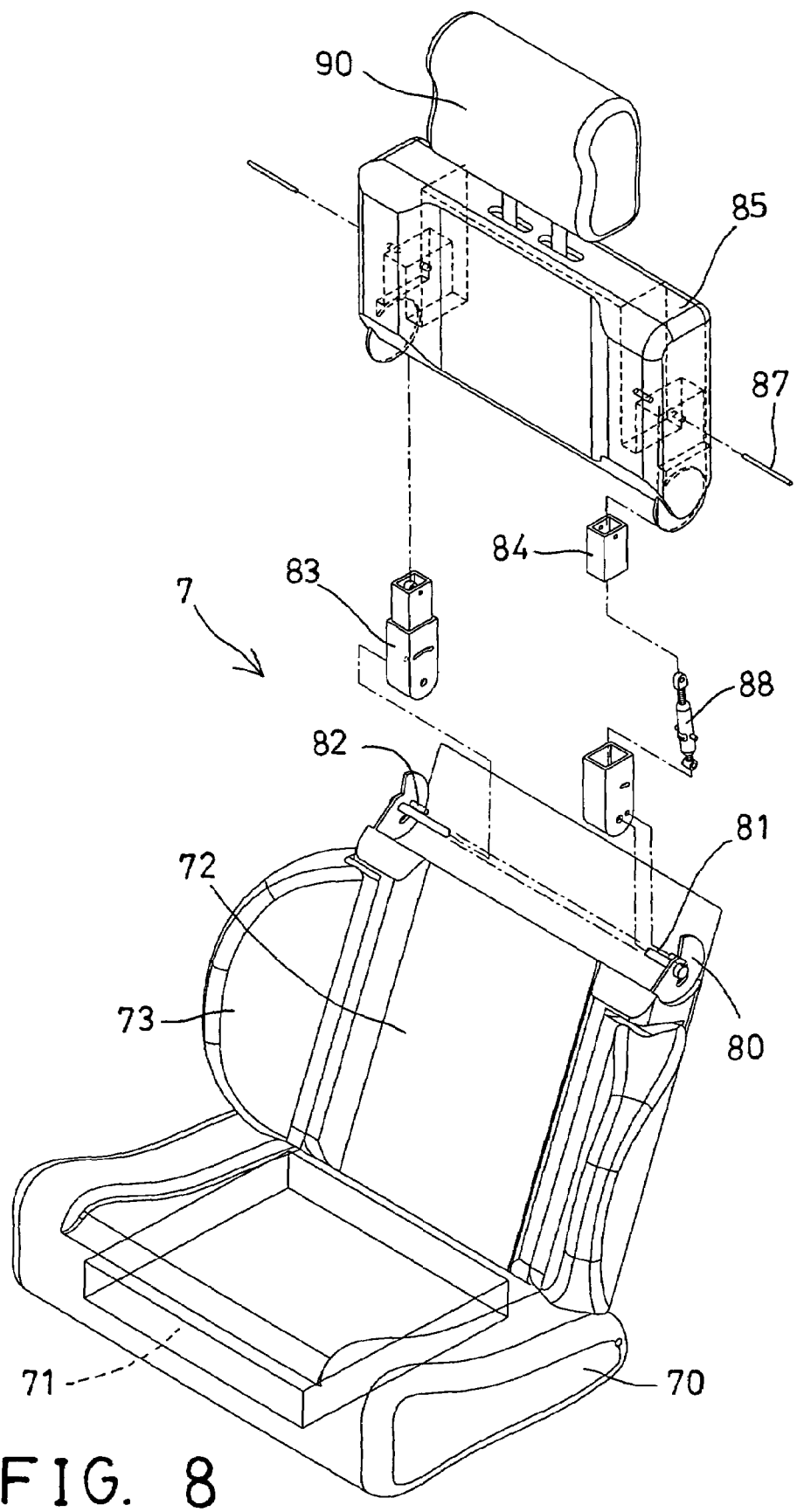
FIG. 8 is another partial exploded view of the shock and energy dissipating assembly.

As shown in FIG. 8, the lower back member 72 includes two plates 80 attached or disposed on top for supporting a spindle 81 between the plates 80, and the plates 80 each includes a pin 82 extended therefrom and preferably disposed parallel to the spindle 81, two casings 83 are attached or secured to the plates 80 with the spindle 81 and the pin 82, and two blocks 84 are slidably attached into the casings 83 respectively. An upper back member 85 includes two cavities 86 formed therein (FIG. 9) for receiving the blocks 84 which are secured to the upper back member 85 with such as latches 87 (FIG. 8).

Figure 9:
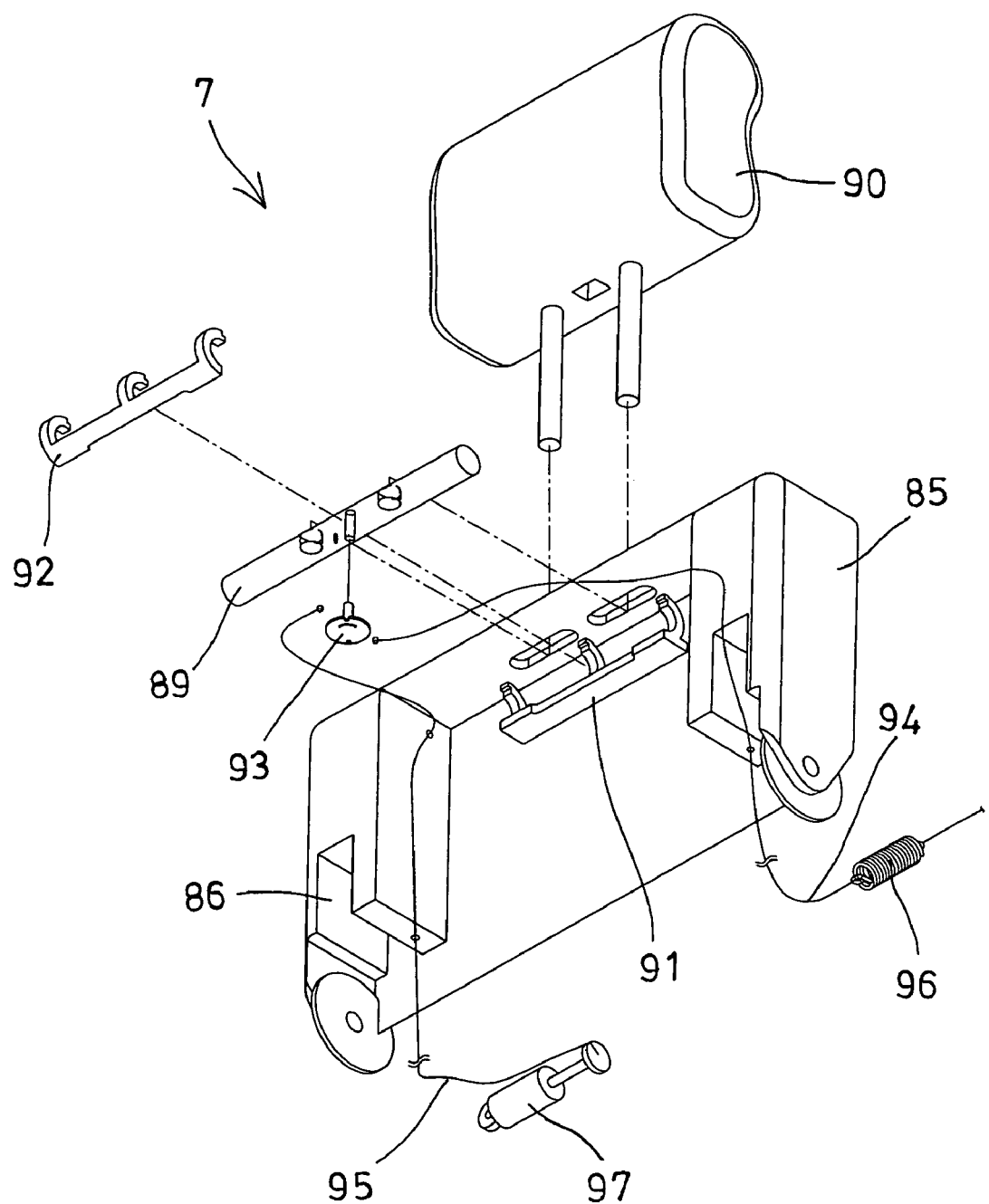
FIG. 9 is a further partial exploded view of the shock and energy dissipating assembly.

As also shown in FIG. 8, one or more, such as two cylinders or actuators 88 are further provided and coupled between the casings 83 and the blocks 84, such as coupled between the latches 87 and the pins 82 for moving the upper back member 85 upwardly and forwardly, or downwardly and rearwardly relative to the lower back member 72. As shown in FIG. 9, an arm 89 is rotatably or pivotally supported in the upper back member 85 for attaching or supporting a head set 90, and the upper back member 85 may include two casing members 91, 92 disposed therein for rotatably or pivotally supporting the arm 89, and for limiting the arm 89 to rotate relative to the upper back member 85.

A disc or pulley 93 is secured to the arm 89 and rotated in concert with the arm 89, and two wires 94, 95 are coupled to the pulley 93 and coupled to a spring member 96 and a cylinder or actuator 97. The spring member 96 may be used for winding the wires 94, 95 onto the pulley 93, for example, and for rotating the arm 89 and the head set 90 relative to the upper back member 85, and the actuator 97 may unwound the wires 94, 95 from the pulley 93 against the spring member 96 in order to rotate the arm 89 and the head set 90 relative to the upper back member 85 clockwise or counterclockwise.

Figure 13:
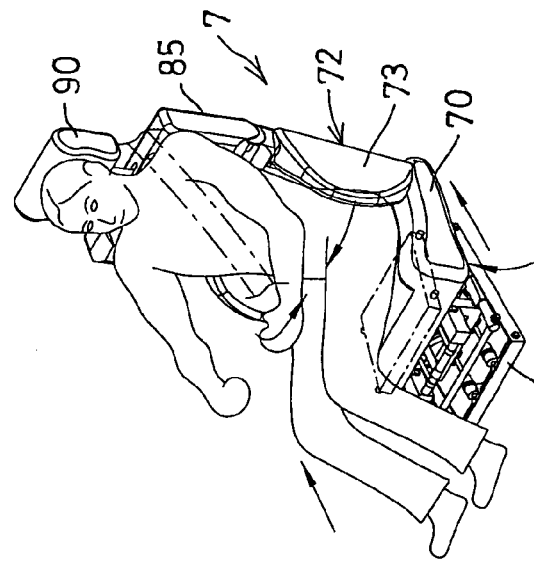
FIG. 13 is a partial upper and front perspective view similar to FIG. 6, illustrating the operation of the shock and energy dissipating assembly.
Figure 12:
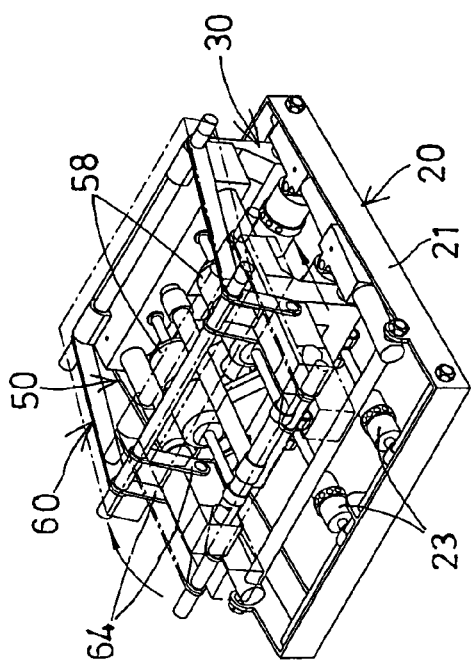
FIG. 12 is a partial upper perspective view similar to FIG. 4, illustrating the operation of the shock and energy dissipating assembly.
Figure 17:
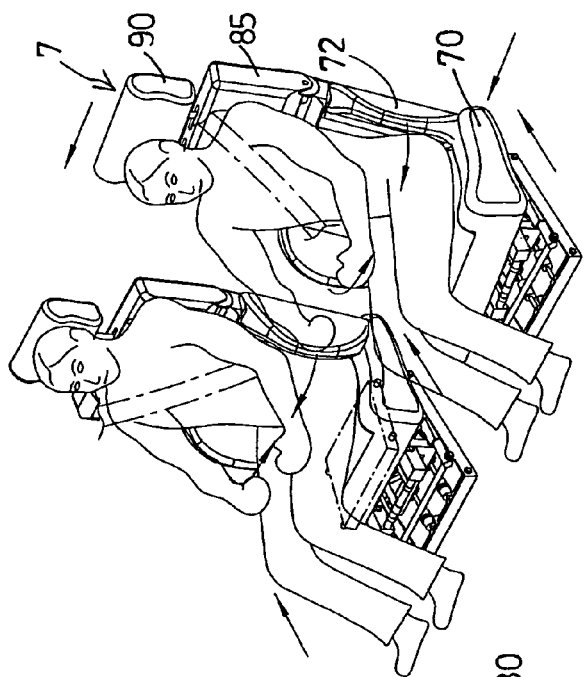
FIG. 17 is a partial upper and front perspective view similar to FIGS. 6 and 13, illustrating the operation of the shock and energy dissipating assembly.
Figure 16:
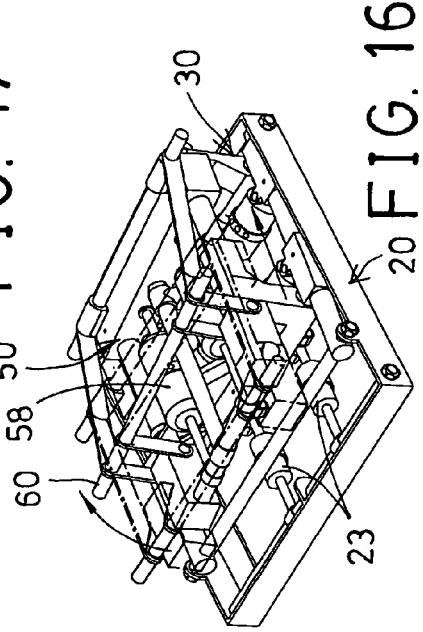
FIGS. 15, 16 are partial upper perspective views similar to FIGS. 4 and 12, illustrating the operation of the shock and energy dissipating assembly.
Figure 15:
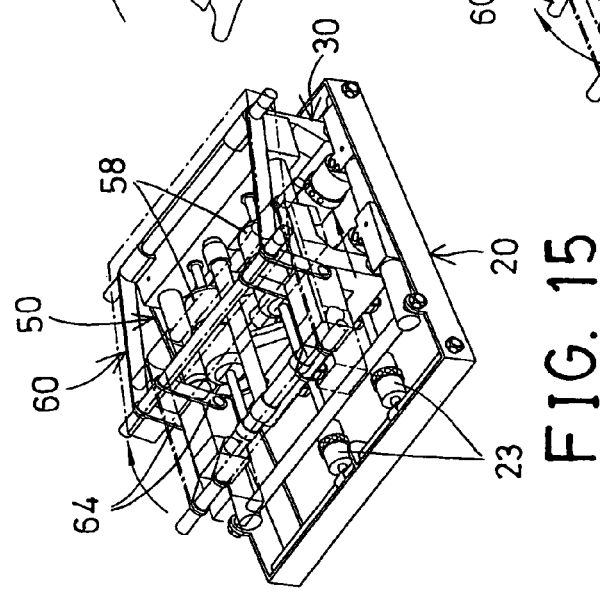
Figure 14:
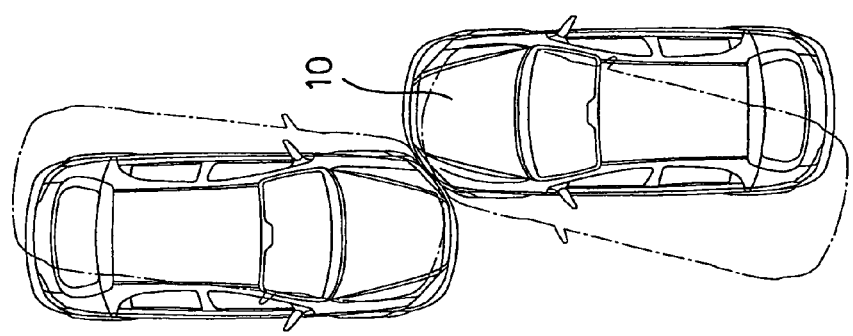
FIG. 14 is a top plan schematic view illustrating the other collision situation of two vehicles.
Figure 27:
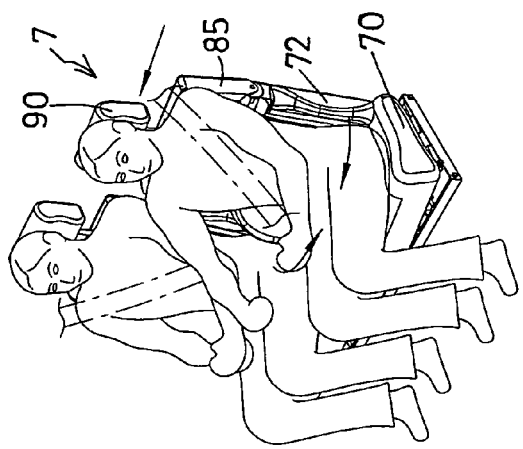
FIG. 27 is a partial upper and front perspective view similar to FIGS. 6, 13, 17, 20 and 23, illustrating the operation of the shock and energy dissipating assembly.
Figure 25:
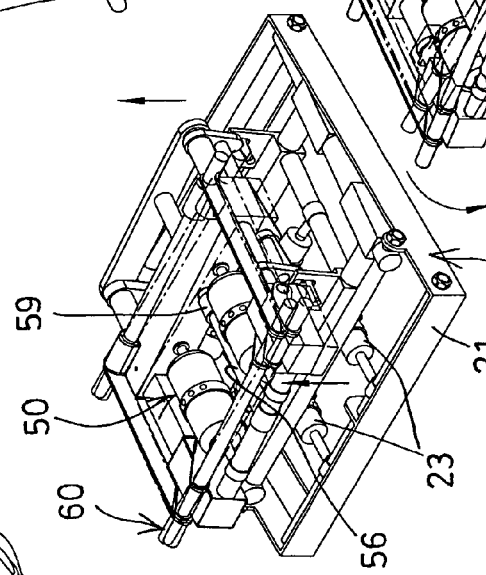
Figure 24:
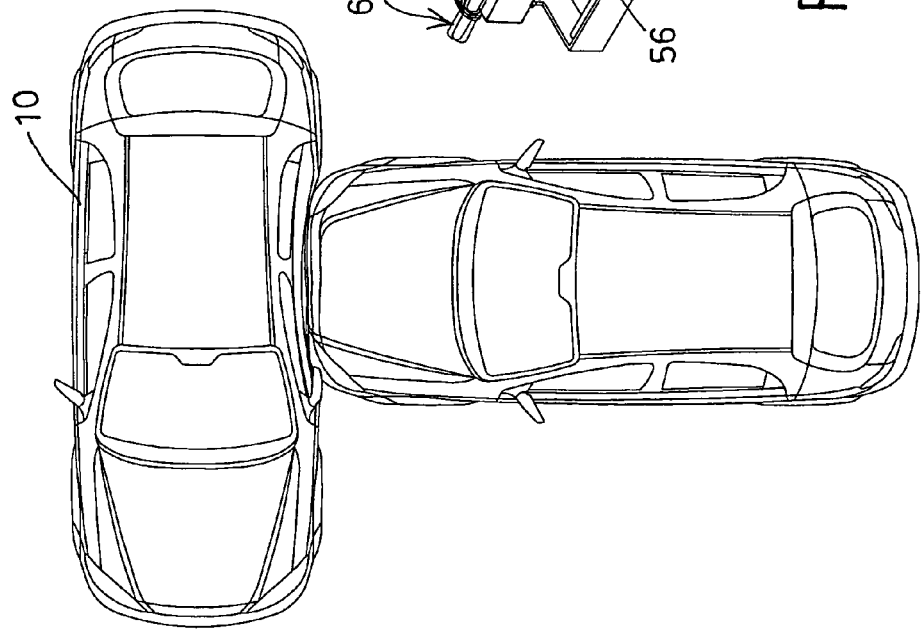
FIG. 24 is a top plan schematic view illustrating the still further collision situation of two vehicles.

The actuators 23 are coupled to the front cylinders 11, the rear cylinders 12, the front and side cylinders 15, and the rear and side cylinders 16 for allowing the actuators 23 to be operated or actuated by either of the cylinders 11, 12, 15, 16, and for moving the carriers 33, 34 and thus the seat device 7 forwardly and rearwardly (FIGS. 12, 13). The actuators 29 are coupled to the right and the left side cylinders 13, 14 for being operated or actuated by either of the cylinders 13, 14 and for moving the link 37 and the carriers 33, 34 and thus the seat device 7 leftwardly and rightwardly or sidewise (FIGS. 25-27).

Figure 22:
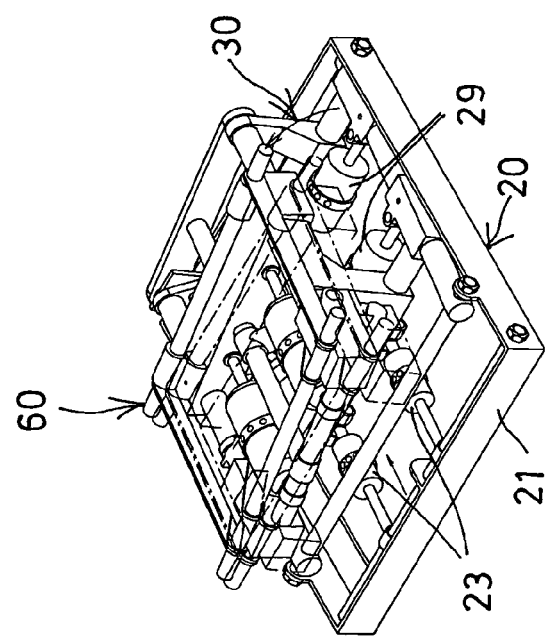
FIG. 22 is a partial upper perspective view similar to FIGS. 4, 12, 15-16, and 19, illustrating the operation of the shock and energy dissipating assembly.

The actuator 39 is coupled to the right and the left side cylinders 13, 14, the front and side cylinders 15, and the rear and side cylinders 16 for being operated or actuated by either of the cylinders 13-16, and for moving the stationary bar 40 and the sliding bar 41 toward or away from the actuators 29, 39, and also for moving the linking bars 45 and the coupling bar 46 and the follower bars 47 and thus the intermediate support 50 and the seat device 7 inclinedly upward and downward (FIG. 22). The actuators 58 are coupled to the front cylinders 11 and the front and side cylinders 15, for moving the beam 57 along the side shafts 52, 53 and for moving the upper support 60 and thus the seat device 7 upwardly and rearwardly (FIGS. 12-13, 15-17).

Figure 26:
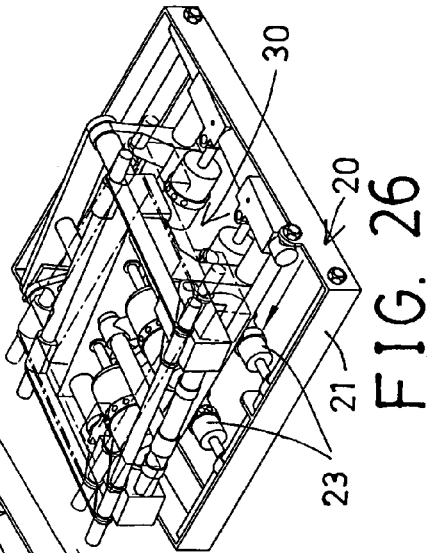
FIGS. 25, 26 are partial upper perspective views similar to FIGS. 4, 12, 15-16, 19 and 22, illustrating the operation of the shock and energy dissipating assembly.

The actuator 59 is coupled to the right and the left side cylinders 13, 14, for being operated or actuated by either of the cylinders 13-14, and for moving the side shaft 52 up and down relative to the lower support 30 by the sliding engagement of the projections 48 in the guide slots 44 of the panels 43, and thus for tilting the intermediate support 50 and the upper support 60 and the seat device 7 relative to the lower support 30 (FIGS. 22, 26).

The actuator 77 is coupled to the right and the left side cylinders 13, 14, and the front and side cylinders 15 for being operated or actuated by either of the cylinders 13-15, and for moving or rotating the axles 74 and thus the flaps 73 inwardly relative to the lower back member 72 (FIGS. 13, 17, 27) in order to hold or retain the vehicle drivers or the passengers between the flaps 73 and for preventing the vehicle drivers or the passengers from moving sidewise or from being disengaged from the base seat member 70 of the seat device 7.

Figure 20:
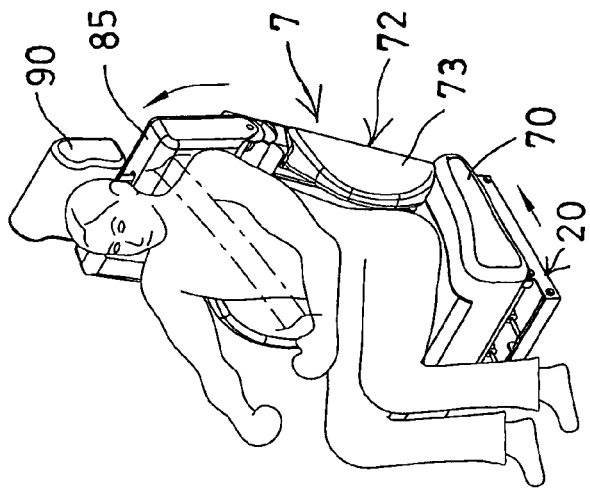
FIG. 20 is a partial upper and front perspective view similar to FIGS. 6, 13, 17, illustrating the operation of the shock and energy dissipating assembly.

The actuator 88 is coupled to the rear cylinders 12 and the rear and side cylinders 16 for moving the upper back member 85 upwardly and forwardly, or downwardly and rearwardly relative to the lower back member 72 (FIG. 20). The actuator 97 is coupled to the rear and side cylinders 16 for moving or rotating the arm 89 and the head set 90 relative to the upper back member 85 clockwise or counterclockwise (FIG. 23), and for protecting and for preventing the heads of the vehicle drivers or the passengers from being twisted or hurt. It is to be noted that the base seat member 70 of the seat device 7 of the typical vehicles may not be moved or actuated in accordance with or in response to the hit or collision at various portions of the vehicle, and the actuators 23, 29, 39, 58, 59, 77, 88, 97 may be acted or used as a moving means for moving the base seat member 70 of the seat device 7 according to the hit or collision at various portions of the vehicle.

In operation, as shown in FIG. 10, when the vehicle 10 is hit by the other vehicle or when two or more vehicles 10 are collided with each other, the cylinders 11-16 that are disposed or attached to the outer peripheral portion of the vehicle 10 will be selectively hit or actuated and will actuate or operate either or some of the actuators 23, 29, 39, 58, 59, 77, 88, 97 to move the base seat member 70 of the seat device 7 accordingly, or the base seat member 70 of the seat device 7 will be actuated in accordance with or in response to the hits or collisions applied to the vehicle 10 in order to absorb or to dissipate the hits or shocks that may be transmitted to the vehicle drivers or the passengers.

Figure 11:
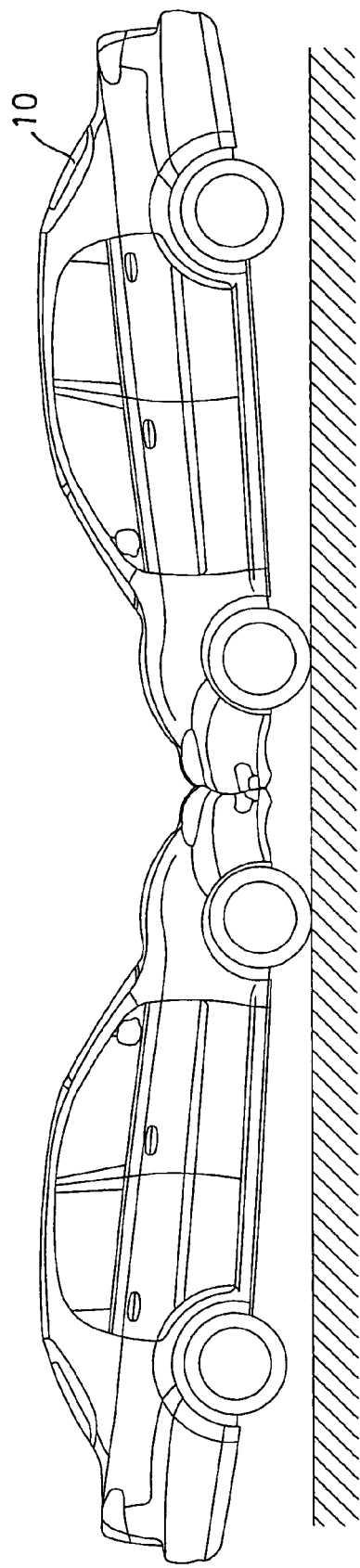
FIG. 11 is a side plan schematic view illustrating the collision of two vehicles.

For example, as shown in FIGS. 11-13, when the front portion of the vehicle 10 and the front cylinders 11 are hit by others or hit onto the other objects, the front cylinders 11 may be actuated or forced to operate the actuators 23 and to move the base seat member 70 of the seat device 7 rearwardly, and simultaneously to operate the actuators 58 to move the upper support 60 and thus the seat device 7 rearwardly and upwardly in order to absorb or to dissipate the forces or energy that may be transmitted to the vehicle drivers or the passengers. The front cylinders 11 may also actuate the actuator 77 to rotate the flaps 73 inwardly to hold or retain the vehicle drivers or the passengers between the flaps 73.

As shown in FIGS. 14-17, when the front and side portions of the vehicle 10 and the front and side cylinders 15 are hit by others or hit onto the other objects, the front and side cylinders 15 may be actuated or forced to operate the actuators 23, 58, 77 and to move the base seat member 70 of the seat device 7 accordingly, and simultaneously to operate the actuator 39 to move the stationary bar 40 and the sliding bar 41 toward or away from the actuators 29, 39, and also to move the linking bars 45 and the coupling bar 46 and the follower bars 47 and thus the intermediate support 50 and the seat device 7 inclinedly upward and downward.

Figure 18:
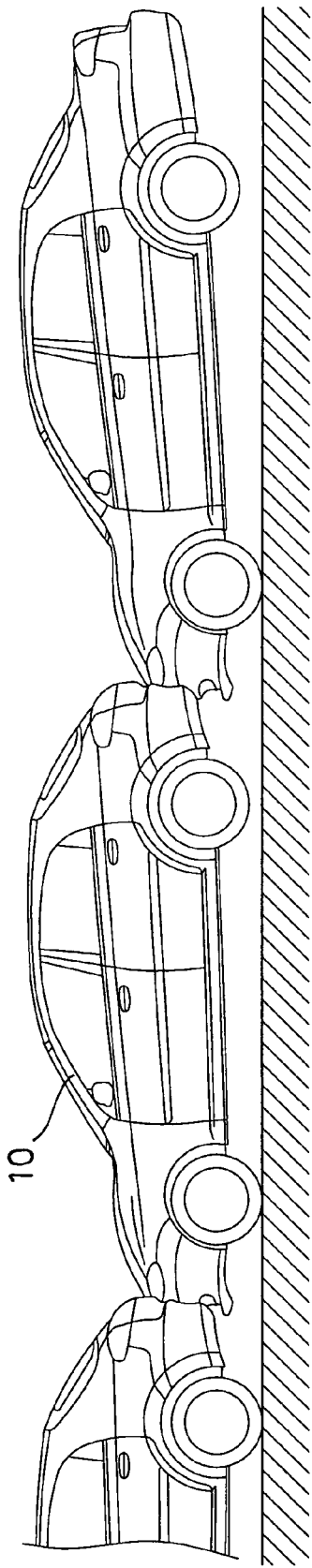
FIG. 18 is a side plan schematic view illustrating the further collision of three vehicles.
Figure 19:
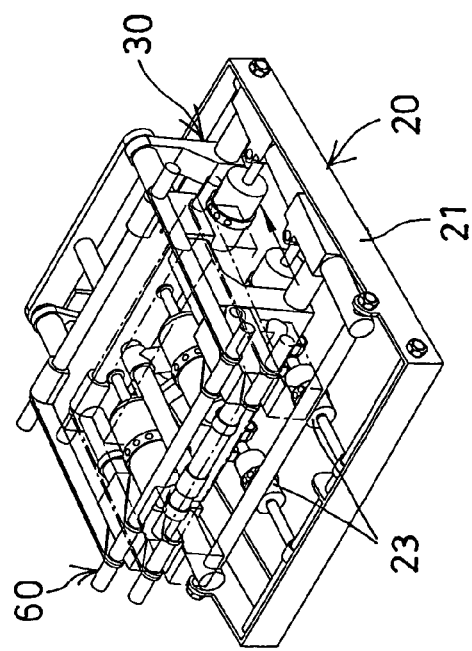
FIG. 19 is a partial upper perspective view similar to FIGS. 4, 12, 15-16, illustrating the operation of the shock and energy dissipating assembly.

As shown in FIGS. 18-20, when the rear portion of the vehicle 10 and the rear cylinders 12 are hit by others or hit onto the other objects, the rear cylinders 12 may be actuated or forced to operate the actuators 23 and to move the base seat member 70 of the seat device 7 rearwardly, and simultaneously to operate the actuator 88 to move the upper back member 85 upwardly and forwardly relative to the lower back member 72 in order to hold and to support and to protect the upper portion and the head and the neck of the vehicle drivers or the passengers.

Figure 23:
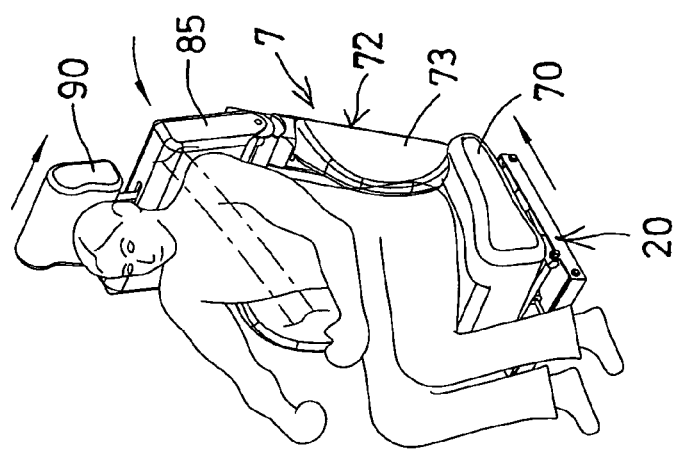
FIG. 23 is a partial upper and front perspective view similar to FIGS. 6, 13, 17 and 20, illustrating the operation of the shock and energy dissipating assembly.
Figure 21:
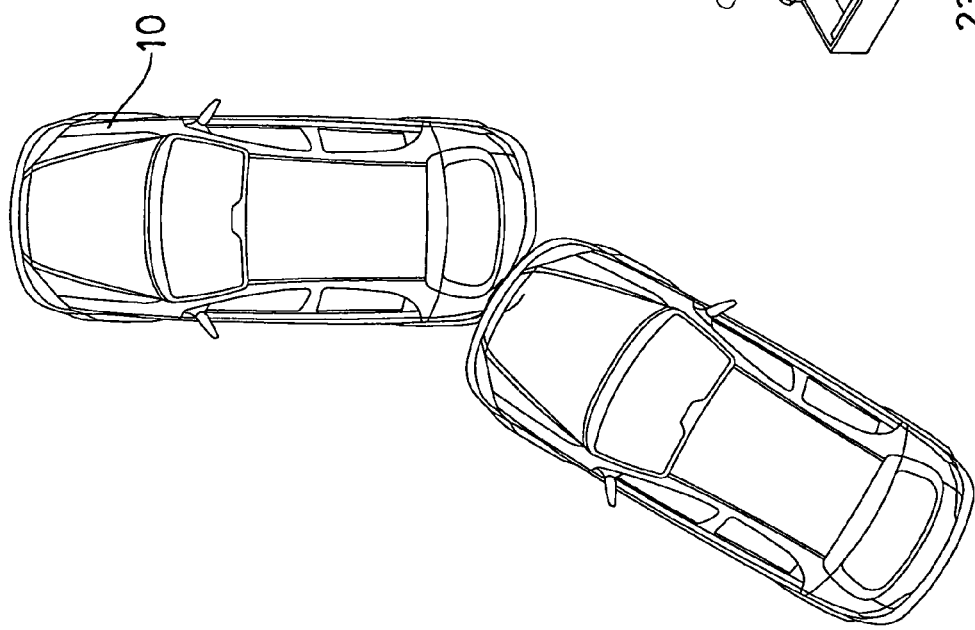
FIG. 21 is a top plan schematic view illustrating the still further collision situation of two vehicles.

As shown in FIGS. 21-23, when the rear and side portions of the vehicle 10 and the rear and side cylinders 16 are hit by others or hit onto the other objects, the rear and side cylinders 16 may be actuated or forced to operate the actuators 23, 39, 88, and to move the base seat member 70 and the flaps 73 of the seat device 7 accordingly, and simultaneously to operate the actuator 97 to rotate the arm 89 and the head set 90 relative to the upper back member 85 and to protect and to prevent the heads of the vehicle drivers or the passengers from being twisted or hurt.

As shown in FIGS. 24-27, when the side portions of the vehicle 10 and the side cylinders 13, 14 are hit by others or hit onto the other objects, the side cylinders 13, 14 may be actuated or forced to operate the actuators 29, 39, 77, and to move the base seat member 70 and the flaps 73 of the seat device 7 accordingly, and simultaneously to operate the actuator 39 to move the stationary bar 40 and the sliding bar 41 and to move the linking bars 45 and the coupling bar 46 and the follower bars 47 and thus the intermediate support 50 and the seat device 7 inclinedly upward and downward in order to absorb or to dissipate the hits or shocks or energy.

Figure 28:
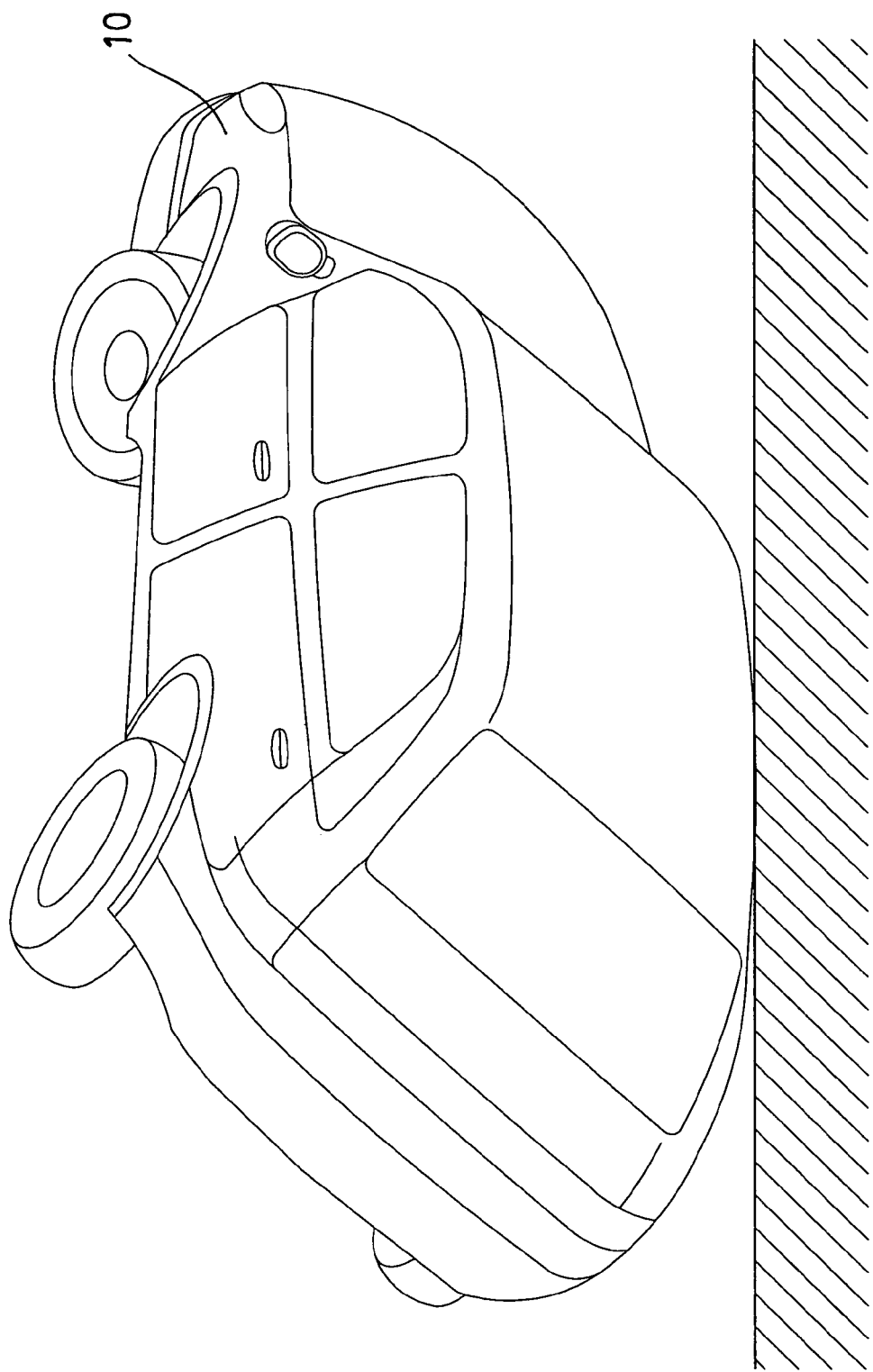
FIG. 28 is a perspective view illustrating the still further collision situation of two vehicles.

As shown in FIG. 28, when the vehicle 10 is rolling or has the side portions hit onto the ground, the base seat member 70 of the seat device 7 may be moved and/or tilted toward the center or middle portion of the vehicle 10 for preventing the vehicle drivers or the passengers from hitting onto the side portions of the vehicle 10, and the flaps 73 may also be actuated to hold or to retain the vehicle drivers or the passengers between the flaps 73 and thus for preventing the vehicle drivers or the passengers from flying out of the vehicle 10.

Figure 29:
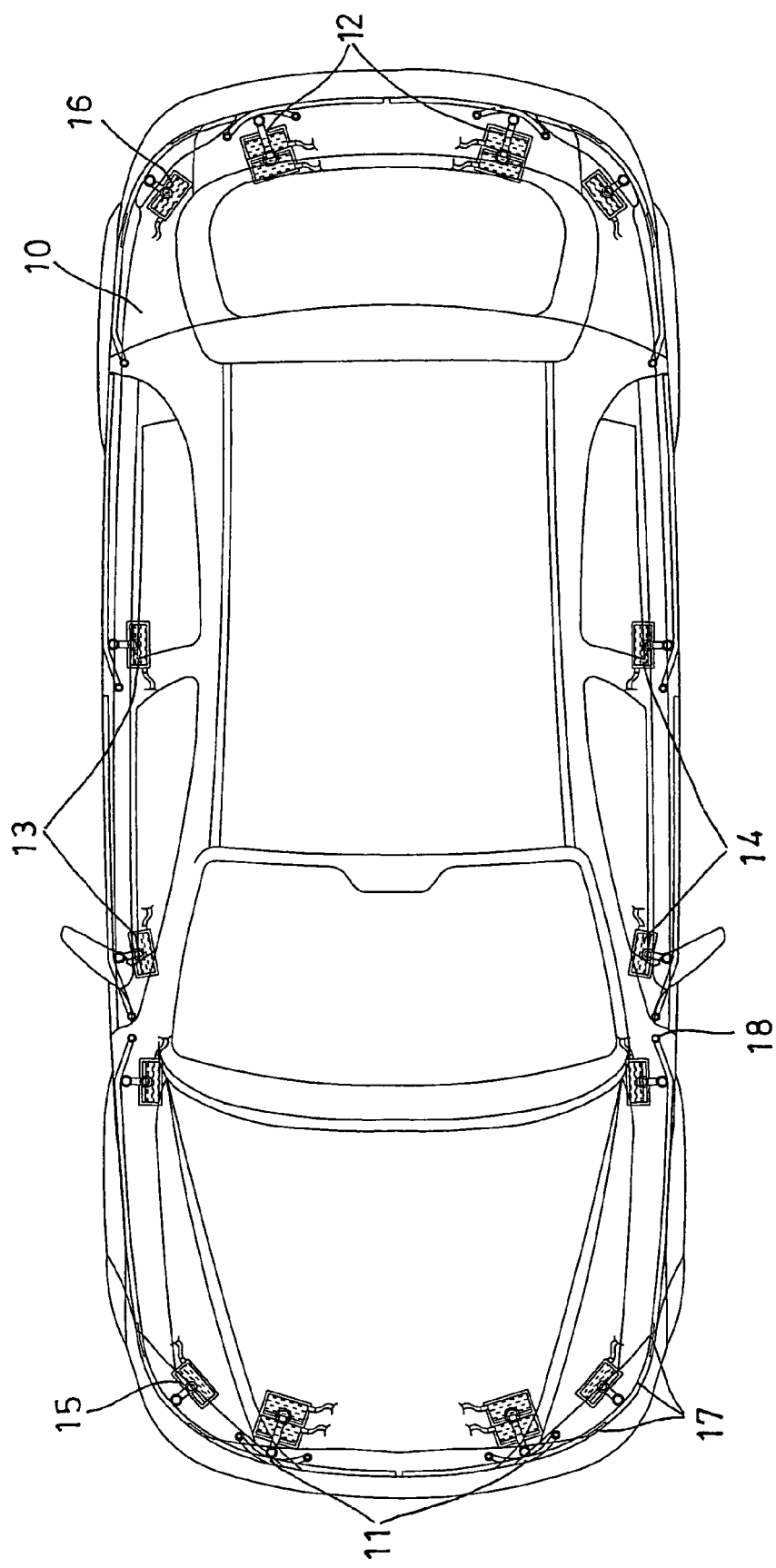
FIG. 29 is am upper plan schematic view similar to FIG. 1, illustrating the other arrangement of the shock and energy dissipating assembly.
Figure 30:
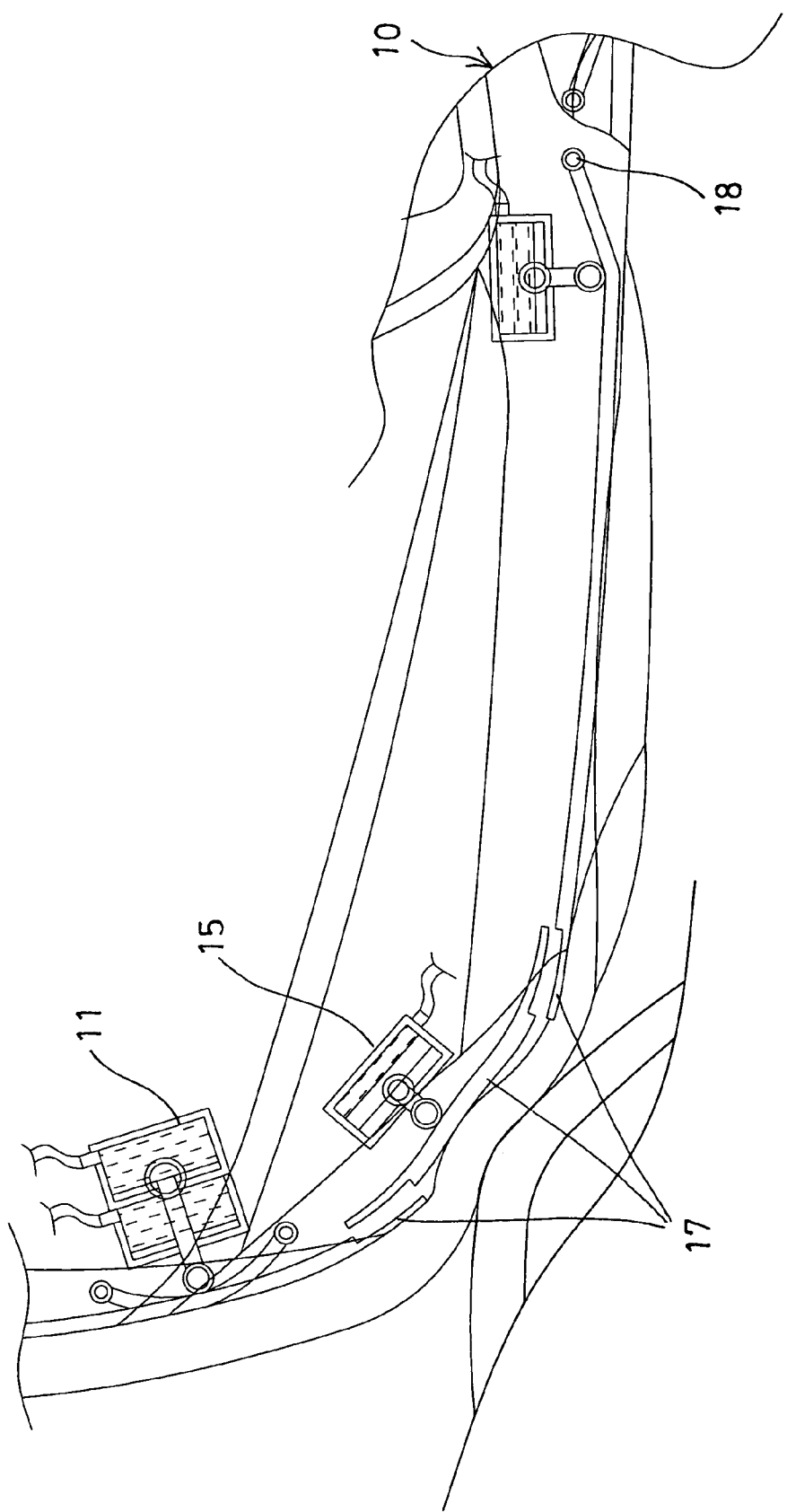
FIG. 30 is an enlarged partial plan schematic view illustrating the operation of the shock and energy dissipating assembly as shown in FIG. 29.

As shown in FIGS. 29-30, a number of actuating levers 17 may be pivotally attached to the outer peripheral portion of the vehicle 10 with such as pivot axles 18, and each of the actuating levers 17 is provided for actuating or operating one or more of the cylinders 11-16, and the actuating levers 17 are also arranged for preventing the actuating levers 17 from being actuated simultaneously, or for allowing only one or few of the actuating levers 17 to be actuated or operated at one time.

Accordingly, the shock and energy dissipating assembly in accordance with the present invention may be attached to vehicles for absorbing and for dissipating the hits or collisions or shocks that may be transmitted to the vehicle drivers or the passengers and for preventing the vehicle drivers or the passengers from being hurt, and for attaching or coupling to the seats of the vehicles and for allowing the seats to be moved in response to the directions of the hits or shocks applied to the vehicles.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A shock and energy dissipating assembly comprising:
   a vehicle,
   a plurality of cylinders attached to an outer peripheral portion of said vehicle for being actuated when a force is applied onto said outer peripheral portion of said vehicle, said cylinders including at least one front cylinder attached to a front portion of said vehicle, at least one rear cylinder attached to a rear portion of said vehicle, at least one right side cylinder attached to a right side portion of said vehicle, at least one left side cylinder attached to a left side portion of said vehicle, at least one front and side cylinder attached to a front and side portion of said vehicle, and at least one rear and side cylinder attached to a rear and side portion of said vehicle,
   a seat device including a base seat member,
   a base support for attaching to a bottom of said vehicle,
   an upper support for attaching to said base seat member of said seat device, and
   a moving means disposed between said base support and said upper support and coupled to said cylinders for moving said base seat member of said seat device in response to said cylinders and for absorbing and dissipating an energy that may be transmitted to vehicle drivers or passengers of said vehicle.

2. The shock and energy dissipating assembly as claimed in claim 1, wherein said moving means includes a lower support disposed above said base support, and at least one first actuator coupled between said lower support and said base support for said lower support forwardly and rearwardly relative to said base support.

3. A shock and energy dissipating assembly comprising:
   a vehicle,
   a plurality of cylinders attached to an outer peripheral portion of said vehicle for being actuated when a force is applied onto said outer peripheral portion of said vehicle,
   a seat device including a base seat member,
   a base support for attaching to a bottom of said vehicle,
   an upper support for attaching to said base seat member of said seat device, and
   a moving means disposed between said base support and said upper support and coupled to said cylinders for moving said base seat member of said seat device in response to said cylinders and for absorbing and dissipating an energy that may be transmitted to vehicle drivers or passengers of said vehicle, said moving means including a lower support disposed above said base support, and at least one first actuator coupled between said lower support and said base support for said lower support forwardly and rearwardly relative to said base support, and
   said base support including a middle rod and a rear rod spaced away from each other, two sliding rods slidably attached onto and movable along said rear and said middle rods, and at least one second actuator coupled between said lower support and one of said sliding rods of said base support for moving said lower support sidewise relative to said base support.

4. The shock and energy dissipating assembly as claimed in claim 3, wherein said lower support includes a front pole and a rear pole slidably attached between said sliding rods and movable along said sliding rods, two carriers slidably attached onto said front and said rear poles respectively and coupled together to said at least one second actuator for moving said carriers along said front and said rear poles.

5. The shock and energy dissipating assembly as claimed in claim 4, wherein said lower support includes two blocks slidably attached onto each of said sliding rods, said front and said rear poles are attached to said blocks, and said at least one second actuator is coupled to one of said blocks.

6. The shock and energy dissipating assembly as claimed in claim 4, wherein said lower support includes a link coupled between said carriers and coupled to said at least one second actuator.

7. The shock and energy dissipating assembly as claimed in claim 4, wherein said carriers each includes a panel having an inclined guide slot formed therein, said lower support includes a stationary bar, a third actuator coupled between said lower support and said stationary bar for moving said stationary bar relative to said lower support, two linking bars pivotally coupled to said stationary bar and each having a coupling bar, and two follower bars attached to said coupling bars respectively and each having a projection slidably engaged into said guide slots of said panels respectively for guiding said follower bars to move up and down by a sliding engagement of said projections in said guide slots of said panels and by said third actuator.

8. The shock and energy dissipating assembly as claimed in claim 7, wherein said carriers each includes a channel formed therein, said lower support includes a sliding bar slidably attached between said carriers and slidably engaged in said channels of said carriers, and said sliding bar is coupled to said stationary bar for being moved by said third actuator.

9. The shock and energy dissipating assembly as claimed in claim 7, wherein said carriers each includes an upwardly extending column, and an intermediate support is disposed above said lower support and includes a frame having two side shafts attached to said columns of said carriers and to said follower bars for allowing said frame of said intermediate support to be moved up and down by the sliding engagement of said projections in said guide slots of said panels and by said third actuator.

10. The shock and energy dissipating assembly as claimed in claim 9, wherein said intermediate support includes a front shaft and a rear shaft coupled between said side shafts, a beam slidably attached onto said side shafts and movable toward and away from said rear shaft, and a fourth actuator coupled between said front shaft and said beam for moving said beam along said side shafts.

11. The shock and energy dissipating assembly as claimed in 10, wherein said intermediate support includes a middle shaft disposed between said side shafts and disposed between said front and said rear shafts, and a fifth actuator coupled between said middle shaft and said lower support for moving said intermediate support up and down relative to said lower support.

12. The shock and energy dissipating assembly as claimed in 10, wherein said upper support is disposed above said intermediate support and includes a front stick and a rear stick and two side sticks coupled between said front stick and said rear stick, said rear stick is pivotally attached to said beam for allowing said upper support to be pivoted relative to said intermediate support.

13. The shock and energy dissipating assembly as claimed in claim 12, wherein said front stick is pivotally coupled to said intermediate support with at least one coupling stick for guiding said upper support to pivot relative to said intermediate support.

14. A shock and energy dissipating assembly comprising:
a vehicle,
a plurality of cylinders attached to an outer peripheral portion of said vehicle for being actuated when a force is applied onto said outer peripheral portion of said vehicle,
a seat device including a base seat member,
a base support for attaching to a bottom of said vehicle,
an upper support for attaching to said base seat member of said seat device, and
a moving means disposed between said base support and said upper support and coupled to said cylinders for moving said base seat member of said seat device in response to said cylinders and for absorbing and dissipating an energy that may be transmitted to vehicle drivers or passengers of said vehicle, and
said seat device including a lower back member pivotally attached to said base seat member, and two side flaps pivotally attached to side portions of said lower back member with axles, and a rotating means for rotating said axles and said side flaps relative to said lower back member to protect a user between said side flaps.

15. The shock and energy dissipating assembly as claimed in claim 14, wherein said rotating means includes two cables attached onto said axles respectively, two springs engaged onto said axles for winding said cables onto said axles, and an actuator coupled to said cables respectively for unwinding said cables from said axles against said springs in order to rotate said axles and said flaps relative to said lower back member.

16. The shock and energy dissipating assembly as claimed in claim 15, wherein said lower back member includes two pulleys for winding and supporting said cables and two pulleys attached to said axles for engaging with said cables respectively.

17. The shock and energy dissipating assembly as claimed in claim 14, wherein said seat device includes an upper back member attached onto said lower back member, and an actuator coupled between said upper back member and said lower back member for moving said upper back member relative to said lower back member.

18. The shock and energy dissipating assembly as claimed in claim 17, wherein said seat device includes a head seat rotatably attached to said upper back member, and means for rotating said head seat relative to said upper back member.

* * * * *